No. 12,057. Reissued Nov. 25, 1902.
W. R. EDELEN.
BURGLAR ALARM OR DOOR SIGNAL.
(Application filed Aug. 28, 1902.)
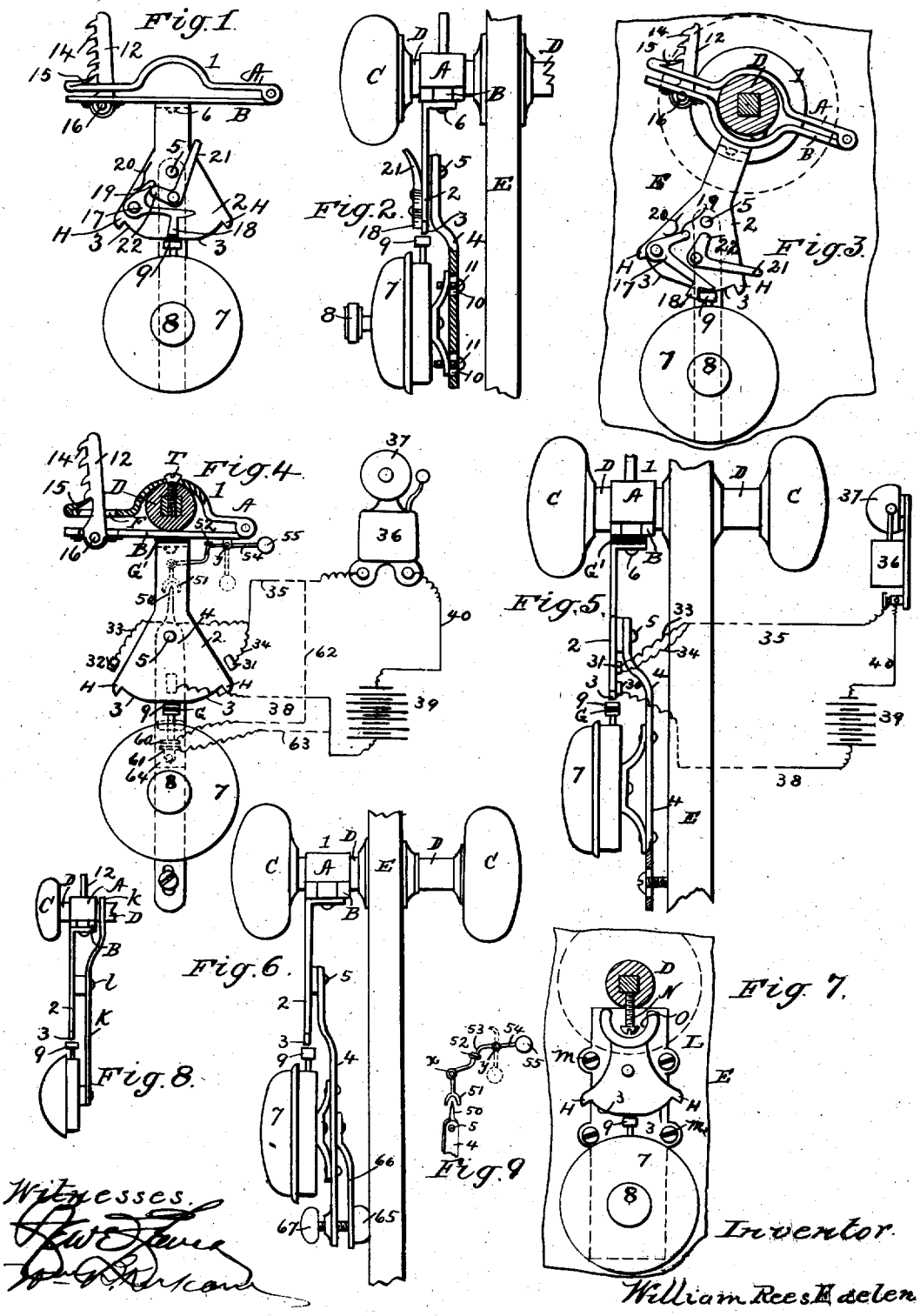

UNITED STATES PATENT OFFICE.

WILLIAM REES EDELEN, OF WASHINGTON, DISTRICT OF COLUMBIA.

BURGLAR-ALARM OR DOOR-SIGNAL.

SPECIFICATION forming part of Reissued Letters Patent No. 12,057, dated November 25, 1902.

Original No. 679,957, dated August 6, 1901. Application for reissue filed August 28, 1902. Serial No. 121,403.

*To all whom it may concern:*

Be it known that I, WILLIAM REES EDELEN, a citizen of the United States, residing at Washington, in the District of Columbia, have invented certain new and useful Improvements in Burglar-Alarms or Door-Signals; and I do hereby declare the following to be a full, clear, and exact description of the invention, such as will enable others skilled in the art to which it appertains to make and use the same.

My invention has reference to improvements in burglar-alarms or door-signals which are preferably secured pendent to a door-knob or the shank pertaining thereto and which consists of certain novel features of construction which will be hereinafter described in the specification in conjunction with the drawings, and clearly pointed out in the claims.

One object of the present invention is to provide an efficient and practical burglar-alarm which may be operated when a door-knob is turned or partly turned and the inmates of a house or room be notified by means of a continuous or periodically sounding gong or bell and also the would-be intruder, whereby they may be scared away, and thus preventing them from entering a room or house, or the alarm can be in a remote portion of a house and operated when a door-knob is turned and the burglar not be aware that an alarm or bell has been sounded. It is preferable to have the alarm portable, so that it can be carried about when traveling.

A further object of the invention is to so arrange the device that the alarm will be sounded before the door-latch is released from its keeper, thus scaring off an intruder and at the same time preventing such person from entering a room and startling the occupants. The device is a permanent safeguard on doors in houses or hotels where there are no keys in the locks. With my improved device when the door is unlocked the intruder must of necessity turn the door-knob, and consequently sound an alarm, which will invariably scare the burglars more than the occupants of a room.

A further object of the invention is to provide a telltale, whereby the occupants of a room can ascertain if the door-knob has been turned in case the door has been locked and the party forgetting to wind up the alarm. Many persons prowl around trying doors to ascertain if they can enter a house. With this device the occupants are aware of their presence and will govern themselves accordingly.

A further object of the invention is to so construct the mechanism of the device that an alarm may be sounded in all parts of the house simultaneously, either by pure mechanical means or by closing an electric circuit when a door-knob is turned. It is also so arranged that the device can act as a bell for a house and be permanently attached to a door or to other parts of a house for the object in view.

Burglar and other alarms as heretofore constructed have been found objectionable, especially the portable alarms, as they deface a door when attached at a boarding-house or hotel and will not be permitted, and, further, the means for securing the device to doors, especially by ladies, are impractical, as such persons do not understand mechanics sufficiently to apply the devices; but with my simple device a child can attach it without any instructions whatever, and, further, my device does not contact the door, but hangs pendent from the shank of a door-knob. My device is provided with rubber tips or buttons for contacting a door in certain cases; but the rubber does not in the least mar the door or injure the polish on the same.

In the drawings, Figure 1 is a front elevation of the improved device. Fig. 2 is a side elevation of the device secured to a door-knob. Fig. 3 is a front elevation of the device, indicating the position that it would assume when the door-knob has been turned and the locking device in operation for producing a continuous ringing of the bell or gong. Fig. 4 is also a front elevation of the device secured to a door-knob and adapted when the knob is turned to close the circuit of an electric alarm for various parts of a house. Fig. 5 is a side elevation of the device as indicated in Fig. 4. Fig. 6 is also a side elevation of the device, which is provided with a rubber button for contacting a door. Fig. 7 is a front elevation of the device permanently secured to a door or parts adjacent thereto. Fig. 8 is operated in a similar manier to Fig. 1; but the device has an independent device for suspending it to the shank of a door-knob. Fig. 9 is a perspective view of the telltale device, which is indicated in Fig. 4 on the accompanying drawings.

The present invention consists of a clamping device 1, which is provided with two members A and B, respectively, for clamping to the shank D of the door C. Said clamping device is hinged at one end, and the other end is provided with a fastening device for securing it to the door-knob, which consists of a rack 12, provided with slightly-hooked teeth 14 for engaging member A at the turned-up end 15. Said rack is secured to member B at 16. Secured to member B by a rivet 6 is a hanger carrying a cam 2, having a cam-surface 3 for operating the bell 7 through the medium of the push-knob 9, secured to said bell or gong. Pivotally secured to the back of said cam 2 is a bar 4, which carries a bell 7, the latter previously referred to. Secured to said cam 2 is a locking device, which consists of a pivoted lever 17, having a lug 18 thereon for engaging the push-knob 9 for locking the bell when it is desirous to have the bell ring continuously. On the end of said locking device is a projection 19 (and which is provided with a spring 20) for holding the lug 18 in an elevated position by means of a lever 21 and its accompanying toe-piece 22 when it is not desirous of producing a continuous ringing of the bell. (See Figs. 1, 2, and 3 of the accompanying drawings). When the locking device is in the position indicated in Fig. 1, the bell will ring with every movement or partial turn of the door-knob C, and consequently if it should happen that several burglars should turn the door-knob at various times each movement of said knob would sound an alarm. By this means a person would not be compelled to leave his bed or room to wind up the bell or alarm-gong. The cam 2 is provided with stops H for limiting the movement of the cam 2 in case a quick movement of the door-knob should occur. The bell is provided with a milled head 8 for winding up the clockwork of the gong or bell. The bell can be wound up by grasping the gong in a manner similar to an ordinary bicycle-bell. Said bell or gong is secured to the bar 4 by screws 11, which pass through slots 10 in said bar. The slots are for adjusting the bell 7 to compensate for wear of the cam-surfaces 3 of the cam 2 and will also answer for taking up the wear of other parts connected to said bar 4.

In Figs. 4 and 5 the device is constructed for operating a number of bells simultaneously. One method of accomplishing the desired result is to provide an electric alarm, connecting with cam 2 by means of contact-points 30, 31, and 32, respectively. Point 30 is always in contact with cam 2, and by turning a door-knob either to the right or to the left the contact 31 or 32 is engaged, and consequently sounds an alarm through the medium of the wires 35 and 38, leading to the magnets 36 and the battery 39, thus sounding the bell 37 or a number of bells, if so desired. The push-knob 9 is insulated at G and also the member B at G', as indicated in Figs. 4 and 5. The contact-points 30, 31, and 32 can be dispensed with and the mechanism indicated in dotted lines can be substituted, which consists of contacts 60 and 61, provided with an insulating-plate 64 and conducting-wires 62 and 63, connecting to the battery and the bell, as indicated in Fig. 4. The battery is provided for sounding an alarm in a remote part of a house, and the gong-bell adjacent to the door can be sounded at the same time, or it can be dispensed with. In the latter case the burglar would not hear the alarm, but only the parties in the other parts of the house. Any number of alarms can be operated by one door-knob, and thus notify several persons at one time in case some of them would not hear the alarm or be away from their rooms.

In Fig. 6 a rubber stop or pressure-button 65 is provided, which is adjustable on a spring-support 66 and which is provided with an adjusting-screw 67, the latter for changing the position of the rubber button, as the distance varies slightly with makers of door-knobs. This stop is not necessary except when a very light bell is employed, so as to cause friction on the door to prevent the apparatus from turning when the door-knob is turned or when a heavy bell is used, as a quick movement, when the friction of the cam-surface 3 was increased, would also move the bell with the door-knob. The object of the rubber button other than for frictional purposes is to prevent injuring the door when contacting the same.

In Fig. 7 the device is attached to a plate L, which is secured to the door E or the door-jamb by screws *m*. The cam P is pivoted at R to plate L and provided with a partial yoke O and which envelops a lug or screw N, secured to the shank D of the door-knob C and which rings the bell when the door-knob is turned in a manner similar to the other figures in the drawings.

In Fig. 8 the device is also operated by the turning of a door-knob; but a separate hanger K is provided for supporting the bell 7 on the shank D by means of a hooked end *k*, formed on said hanger K, and the cam 2 is pivoted to this hanger at *l* for operating the bell. This device will always keep the bell in a vertical position. The invention is provided with a telltale device for ascertaining if the door-knob has been turned in the absence of a person or in case the alarm should not be wound up. This device consists of a tripping-lever 51, pivoted at *x* to the back of the bar 4 and provided with a forked end which embraces the point 50, forming the extreme upper portion of the said bar 4. The opposite end of said lever 51 is turned upwardly, and projecting therefrom is a finger 52, which supports the end of a tilt-lever 54 when the device is set for operation. The long arm of said tilt-lever has a ball thereon (numbered 55) for allowing said lever to drop, as indicated in dotted lines, when a door-knob has been turned. When operating this device, the bar 4 engages one of the forks of lever 51 through the medium of the point 50, which operates said lever and its accompanying finger 52, thus freeing the lever 54 and allowing it to drop into the position as indicated in dotted lines in Fig. 4 of the drawings.

When the portable alarm is intended to remain permanently upon a door-knob or its shank, it is preferable to secure the clamping device to the shank of the door-knob by means of a screw T, as indicated in Fig. 4. The same screw that is employed for securing the door-knob to the spindle can be employed, thus saving extra expense for securing the clamping device to the door-knob. Any suitable device can be employed for securing the clamping device to the door-knob, such as the rack shown in the accompanying drawings.

In Fig. 3 the device is shown as it would appear when the door-knob was turned and a continuous alarm being sounded, as indicated by the locking device engaging the push-knob 9, and when the hand has been removed from the door-knob the locking device will still hold the alarm or bell in the same relative position as indicated in the figure, although the door-knob has assumed its normal position. When the locking device is elevated, as indicated in Fig. 1, the device will sound an alarm for every movement of the door-knob and will return to the position as indicated in Fig. 1.

Having described my invention, what I claim is—

1. In combination with a burglar-alarm or door-signal suspended from the shank of a door-knob, of a clamping device having a rack thereon for securing said clamping device to the shank of a door-knob, said rack being pivoted to the lower member of said clamping device, and the teeth of said rack engaging the upper member thereof, a hanger extending from said clamping device, a bar pivoted to said hanger and having an adjustable gong thereon, a cam forming the continuation of said hanger and adapted to operate a pin or knob connected to the alarm mechanism of said gong when said knob is turned for the purpose as shown and specified.

2. In combination with a burglar-alarm or door-signal suspended from the shank of a door-knob, composed of a clamping device having a rack thereon for securing said clamping device to the shank of a door-knob, said rack being pivoted to the lower member of said clamping device and the teeth of said rack engaging the upper member thereof, a hanger extending from said clamping device, the extreme end of said hanger being cam-shaped for operating a knob connected to a gong, a bar pivoted to said hanger and having means for adjusting a gong or bell thereon, a locking device, secured to said hanger, said locking device to engage the knob of the gong and to prevent said cam from returning to its normal position when the door-knob is released and said bell is rung as specified.

3. In combination with a burglar-alarm or door-signal suspended from the shank of a door-knob, composed of a clamping device having a rack thereon for securing said clamping device to the shank of a door-knob, a hanger extending from said clamping device, a bar pivoted to said hanger and having an adjustable gong thereon, a cam forming the continuation of said hanger for operating said gong, stops on the extreme ends of the travel of said cam for preventing the gong-knob from leaving the face of said cam for the purpose as shown and described.

4. In combination with a door-signal suspended from the shank of a door-knob consisting of a clamping device having a rack or toothed bar pivoted thereon for securing said clamping device to the shank of a door-knob, a hanger extending from said clamping device and having a cam thereon for operating a gong, a bar pivoted to said hanger and having a gong thereon, an extension above the pivotal point of said bar for operating a telltale device which consists of a tripping-lever and a tilting lever, the tripping-lever being secured to the hanger, and the tilting lever to the clamping device for the purpose as described.

5. In combination with a door-signal or alarm-bell suspended from the shank of a door-knob composed of a clamping device, a hanger suspended from said clamping device with a cam thereon, said cam for operating a knob connected to said alarm-bell, a bar pivoted to said hanger, a spring secured to said bar, a rubber button on said spring for contacting a door for the purpose as described.

6. In combination with an alarm or door signal, suspended from the shank of a door-knob composed of a clamping device, a hanger suspended from said clamping device with a cam thereon, said cam for operating said door-signal, a bar pivoted to said hanger, a spring secured to said bar and carrying a rubber button thereon and an adjusting device for regulating the pressure of said button against a door for the purpose as specified.

7. In combination with a burglar-alarm suspended from the shank of a door-knob, composed of a clamping device, said clamping device consisting of an upper and a lower member, the lower member having a toothed rack pivoted thereto, the teeth of which engage the upper member when clamping the same to a door-knob, a hanger secured to said lower member having a cam thereon, said cam for operating a knob on said burglar-alarm, a bar pivoted to said hanger carrying a bell or gong as specified, and the means for sounding an alarm on said bell or gong.

8. In combination with a burglar-alarm suspended from a door-knob composed of a clamping device, said clamping device consisting of two members which are clamped to a door-knob by a toothed rack pivoted to the lower member and engaging the upper member of said clamping device, a hanger secured to the lower member of said clamping device and carrying a cam thereon for engagement with a knob attached to an alarm-bell, a bar pivoted to said hanger for supporting said alarm-bell, a tilting lever secured to the lower member of said clamping device which engages with a tripping-lever on said hanger and operated by the extension on said bar pivoted to said hanger for the purpose as shown and described.

9. In combination with a burglar-alarm suspended from the shank of a door-knob, composed of a clamping device, said clamping device consisting of an upper and a lower member, a hanger secured to said lower member, with a cam thereon, said cam for operating an alarm-bell, a telltale device secured to said lower member of the clamping device and said hanger the telltale device acting independently of the signal, a bar pivoted to said hanger having thereon an extension for operating said telltale device when a door-knob is turned for sounding an alarm on a bell or gong for the purpose as shown.

10. The combination with an alarm or signal bell having a movable control device adapted when moved to effect the ringing thereof, of a movable arm or plate having a cam-shaped portion adapted upon movement of the plate to bear upon and move said control device in a direction approximately at right angles to the axis of rotation of a door-knob, and connections between the plate or arm and said door-knob or its shank for transmitting movement to the plate upon turning of the knob.

11. The combination with an alarm or signal bell having a movable control device adapted when moved to effect the ringing thereof, of a movable arm or plate having a double cam-shaped portion one part or the other of which is adapted upon movement of the arm or plate in either direction to bear upon and move said control device in a direction approximately at right angles to the axis of rotation of a door-knob, and connections between the plate or arm and said door-knob or its shank for transmitting movement to the arm or plate upon turning of the knob.

12. The combination with an alarm or signal bell having a movable control device adapted when moved to effect the ringing thereof, of an arm or plate secured at one end to the door-knob or its shank and having a cam-shaped outline at its other end adapted upon movement of the door-knob to bear upon and move the control device in a direction approximately at right angles to the axis of rotation of said knob.

13. The combination with an alarm or signal bell having a movable control device adapted when moved to effect the ringing thereof, of an arm or plate secured at one end to a door-knob or its shank and having along its edge a double cam-surface one part or the other of which is adapted to bear upon and move said control device upon turning of the door-knob in either direction, and a bar or support upon which the bell is mounted pivoted at its upper end to the arm or plate the two parts of the double cam-surface being eccentric to said pivot.

14. An alarm or signal bell attachment for door-knobs consisting of a depending arm or plate secured to a door-knob or its shank, a bar pivoted to said arm, an alarm or signal bell mounted on said bar, a movable control device projecting upwardly from the bell and adapted when moved to effect the ringing of the bell, a double cam-surface along the lower edge of the arm eccentric to the pivot of the bar and one part or the other of which is adapted to bear upon and move said control device according to the direction in which the door-knob is turned.

15. An alarm or signal bell attachment for door-knobs consisting of a depending arm or plate secured to a door-knob or its shank, a bar pivoted to said arm, an alarm or signal bell mounted on said bar, a movable control device projecting upwardly from the bell and adapted when moved to effect the ringing thereof, a double cam-surface along the lower edge of the arm eccentric to the pivot of the bar and one part or the other of which is adapted to bear upon and move said control device according to the direction in which the door-knob is turned, and stops limiting the travel of the control device along the lower edge of the arm.

16. The combination with an alarm or signal bell having a movable control device adapted when moved to effect the ringing of the bell, of a cam adapted when moved to bear upon and move said control device, connections between the cam and a door-knob or its shank for transmitting movement to the cam upon turning of the knob, and an automatically-operating locking device adapted to lock the cam into engagement with the control device after the latter has been moved, thereby effecting a continuous ringing of the bell.

17. The combination with an alarm or signal bell having a movable control device adapted when moved to effect the ringing of the bell, of a double cam adapted upon movement to bear upon and move said control device one part or the other of the double cam being brought into action according to the direction of movement thereof, connections between the cam and a door-knob or its shank for transmitting movement to the cam upon turning of the knob, and an automatically-operating locking device adapted to lock either part of the double cam into engagement with the control device after the latter has been moved, thereby effecting a continuous ringing of the bell.

18. The combination with an alarm or signal bell having a movable control device adapted when moved to effect the ringing of the bell, of a double cam adapted upon movement to bear upon and move said control device one part or the other of the double cam being brought into action according to the direction of movement thereof, connections between the cam and a door-knob or its shank for transmitting movement to the cam upon turning of the knob, and an automatically-operating locking device pivoted to the cam and have a lug normally resting upon the control device but adapted upon movement of the cam to drop to one side or the other of the control device thereby preventing the return of the parts to their normal inactive positions.

19. The combination with an alarm or signal bell having a movable control device adapted when moved to effect the ringing of the bell, of a cam adapted when moved to bear upon and move said control device, connections between the cam and a door-knob or its shank for transmitting movement to the cam upon turning of the knob, an automatically-operating locking device adapted to lock the cam into engagement with the control device after the latter has been moved, thereby effecting a continuous ringing of the bell, and a catch operable to prevent the operation of the locking device.

In testimony whereof I affix my signature in the presence of two witnesses.

WILLIAM REES EDELEN.

Witnesses:

REEVE LEWIS,

WM. B. KERKAM.